US009851623B2

(12) United States Patent
Macmillan et al.

(10) Patent No.: US 9,851,623 B2
(45) Date of Patent: Dec. 26, 2017

(54) MULTI CAMERA MOUNT (71) Applicant: GoPro, Inc., San Mateo, CA (US)

(72) Inventors: Timothy Macmillan, La Honda, CA (US); Ihab A. Ali, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/164,785

(22) Filed: May 25, 2016

(65) Prior Publication Data
US 2016/0349599 A1 Dec. 1, 2016

Related U.S. Application Data (60) Provisional application No. 62/166,584, filed on May 26, 2015.

(51) Int. Cl.
G03B 17/56 (2006.01)
G03B 37/04 (2006.01)

(52) U.S. Cl.
CPC ........... G03B 17/561 (2013.01); G03B 37/04 (2013.01)

(58) Field of Classification Search
USPC ........................................ 396/324, 325, 419
See application file for complete search history.

(56) References Cited

U.S. PATENT DOCUMENTS

| 5,023,725 | A | * | 6/1991 | McCutchen | ........... | G03B 37/04 |
| | | | | | | 348/264 |
| 6,141,034 | A | | 10/2000 | McCutchen | | |
| 6,163,657 | A | | 12/2000 | Emery | | |
| 6,169,857 | B1 | | 1/2001 | Kaneko | | |

(Continued)

FOREIGN PATENT DOCUMENTS

| CA | 2890174 A1 | 5/2014 |
| CN | 101630117 | 1/2010 |

(Continued)

OTHER PUBLICATIONS

Geerds, J., "360 Rig presentation at the IVRPA conference in NYC," IVRPA presentation, dated Jun. 21, 2012, 6 Pages, Can be retrieved at <URL:http://freedom360.us/360-rig-presentation-at-the-ivrpa-conference-in-nyc/>.

(Continued)

*Primary Examiner* — Clayton E Laballe
*Assistant Examiner* — Linda B Smith
(74) *Attorney, Agent, or Firm* — Fenwick & West LLP (57) ABSTRACT

A camera mounting assembly is disclosed for a plurality of cameras. In an example embodiment, the camera mounting assembly has a substantially cubic configuration. The camera mounting assembly includes a cubic configuration that includes one or more detachable frames. Each frame is attached to one or more other detachable frames via a securing mechanism to form the cube structure. Each frame includes one or more arms connected to a lens opening, the lens opening configured to allow a lens of the camera to have an unobstructed view for capturing images. A camera is secured to each frame by a standoff. A first end of the standoff attaches to a corner of the frame and the second end is attached to the camera. A box structure that houses electronics is located at the center of the cubic configuration and the box structure is secured to one or more frames via standoffs.

20 Claims, 4 Drawing Sheets

(56) References Cited

U.S. PATENT DOCUMENTS

| | | | |
|---|---|---|---|
| 7,183,549 B2 * | 2/2007 | Teich | G08B 13/19641 250/330 |
| 7,347,555 B2 | 3/2008 | Grover | |
| 7,463,280 B2 | 12/2008 | Steuart, III | |
| 7,710,463 B2 | 5/2010 | Foote | |
| 8,004,558 B2 | 8/2011 | Prechtl et al. | |
| 8,199,958 B2 * | 6/2012 | Weir | H01M 2/1022 381/332 |
| 8,902,322 B2 | 12/2014 | Ramsay et al. | |
| 9,025,080 B2 | 5/2015 | Samuels et al. | |
| 9,152,019 B2 | 10/2015 | Kintner | |
| 9,185,391 B1 | 11/2015 | Prechtl | |
| 9,188,274 B2 | 11/2015 | Schorman | |
| 9,402,026 B2 * | 7/2016 | St. Clair | H04N 5/23238 |
| 9,413,930 B2 * | 8/2016 | Geerds | H04N 5/2252 |
| 9,535,311 B2 | 1/2017 | Bergsten | |
| 2005/0141089 A1 | 6/2005 | Grover | |
| 2007/0071423 A1 | 3/2007 | Fantone et al. | |
| 2007/0206945 A1 | 9/2007 | DeLorme et al. | |
| 2007/0235648 A1 * | 10/2007 | Teich | G08B 13/19641 250/330 |
| 2009/0206077 A1 | 8/2009 | Melmon et al. | |
| 2011/0069148 A1 | 3/2011 | Jones et al. | |
| 2011/0249100 A1 | 10/2011 | Jayaram et al. | |
| 2012/0154521 A1 | 6/2012 | Townsend et al. | |
| 2012/0242786 A1 * | 9/2012 | Sasagawa | H04N 5/247 348/36 |
| 2014/0153916 A1 | 6/2014 | Kintner | |
| 2014/0160274 A1 | 6/2014 | Ishida et al. | |
| 2016/0037026 A1 | 2/2016 | Kintner | |

FOREIGN PATENT DOCUMENTS

| | | |
|---|---|---|
| CN | 101963751 | 2/2011 |
| CN | 202652367 | 1/2013 |
| EP | 2915324 A1 | 9/2015 |
| WO | WO 2014/071400 A1 | 5/2014 |

OTHER PUBLICATIONS

Geerds, J., "360° video recording using six Xperia™ neo phones," dated Nov. 10, 2011, Xperia videos—"Linking the Phones" 2 pages, Can be retrieved at <URL:https://developer.sonymobile.com/2011/11/10/xperia-studio-shows-360-video-recording-using-six-xperia-neo-phones/>.

Sonyericsson, "A Ride Down Slickrock Trail" dated Oct. 27, 2011, 2 Pages, Can be retrieved at <URL:https://www.youtube.com/watch?v=-smYSGCYB2c>.

* cited by examiner

MULTI CAMERA MOUNT

CROSS REFERENCE TO RELATED APPLICATION

This application claims the benefit of U.S. Provisional Application No. 62/166,584, filed May 26, 2015, the content of which is incorporated by reference in its entirety.

TECHNICAL FIELD

The disclosure generally relates to the field of camera mounts, and more particularly, a mount for securing a plurality of cameras within a releasable openable encasement.

BACKGROUND

Cameras may be mounted on or within mounts for various reasons. One reason for mounting a camera is to ensure that the camera is still while capturing images, thus trying to avoid out-of-focus images, leading to capture of high quality images. Most camera mounts are for mounting a single camera. To accommodate multiple cameras, and accordingly, multiple views, multiple camera mounts are used to capture images from the different views. Typically, mounts are connected together to accommodate multiple cameras. Some mounts allow for mounting more than one camera, but a problem with these conventional mounts is that they do not allow cameras to remain in specifically fixed positions. As cameras are prone to movement within conventional mounts, fields of views become misaligned, for example, with significant overall or gaps. Accordingly, it is very difficult to process such images, for example, to stitch a plurality of captured images from a plurality of camera into a single composite image.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Described is a camera mounting assembly. The camera mounting assembly may have a substantially cubic configuration. The camera mounting assembly may include N cameras used to capture a 4 pi steradian image. Each camera may be mounted within the camera mounting assembly such that each camera may capture a portion of the 4 pi steradian image. Additionally, the camera mounting assembly may include a structure to house electronics and processing elements. The processing elements may be configured to stitch the images from each camera to obtain the 4 pi steradian image.

The camera mounting assembly may include a cubic configuration that further may include detachable frames. Each frame may be attached to another detachable frame, such that the attached detachable frames form a cube shaped structure (referenced as the cubic configuration). The frames may be attached to each other at a shared corner of the frames, via a securing mechanism, e.g., a screw. Each frame may include a lens opening that secures a lens of the camera when the camera is mounted on to the frame. A camera is coupled the frame via standoffs. The frames forming the cubic configuration may be constructed of high impact withstanding and weather resistant material. Additionally, the cubic configuration may be an open structure in order to reduce thermal convection that may be caused due to mounting of more than one camera within the camera mounting assembly.

Example Multiple Camera Mount Configuration

Figure 1:
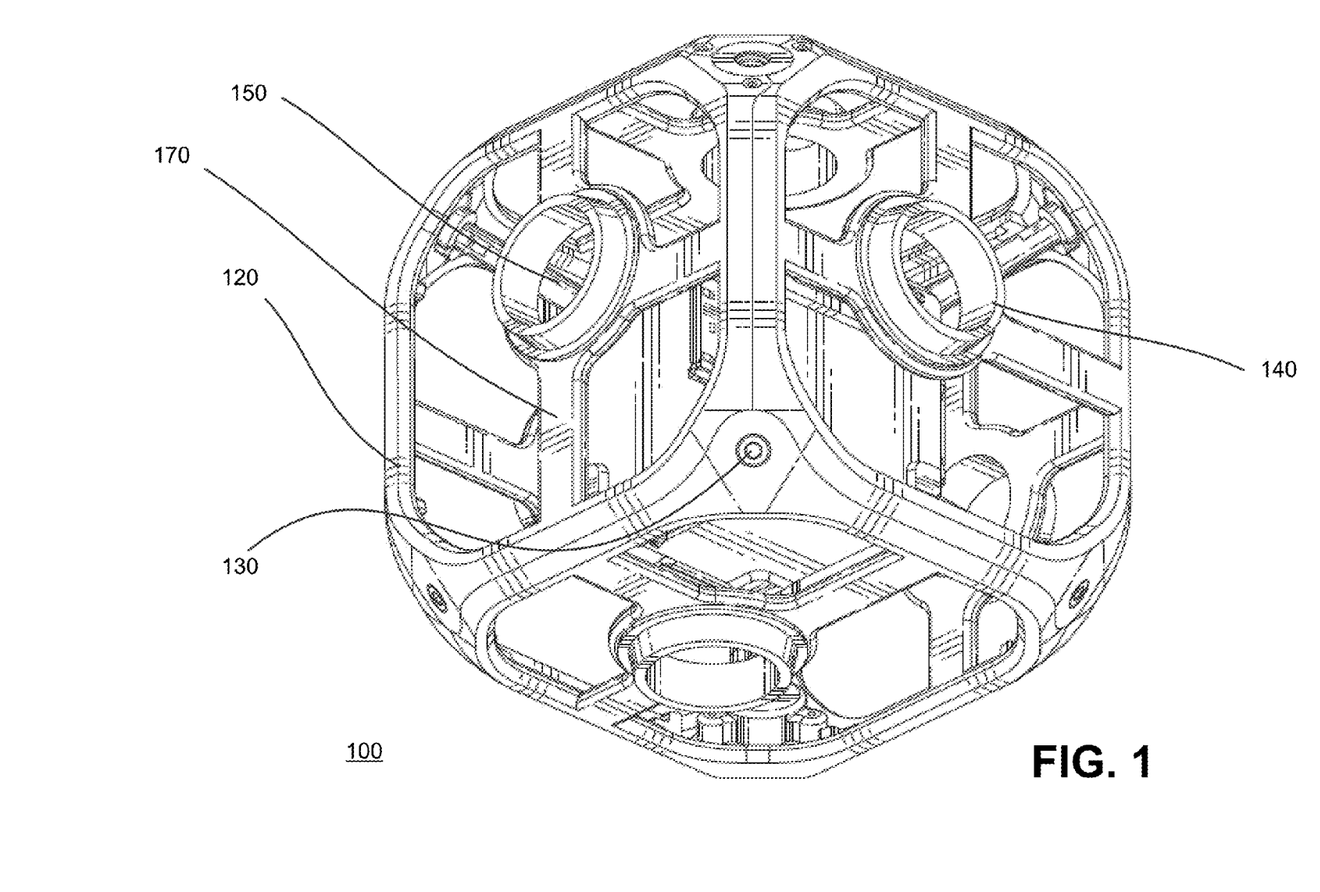
FIG. 1 illustrates a front-bottom perspective view of a camera mounting assembly for a plurality of cameras, the assembly having a substantially cubic configuration, according to an embodiment.

Turning now to Figure (FIG.) 1, it illustrates a front-bottom perspective view of a camera mounting assembly 100 for a plurality of cameras, the assembly having a substantially cubic configuration (or a cubic cage structure), according to an example embodiment. The assembly 100 may be cubic or rectangular box (or rectangular prism) shaped. For ease of discussion, the example embodiment described will be a cubic configuration. In this example embodiment, the cameras are positioned within the cubic configuration such that the thermal convection is reduced as much as possible. For example, the cubic configuration may include open air panels on one or more of the six sides of the structure. The open air panels expose the cameras to air, which beneficially allows for cooling air flow (or circulation) and/or venting. Further heat dissipation may be achieved using heat sinks, although fewer or smaller heat sinks may be used. The structure also may be configured so that a predefined amount of a cavity (or space) may exist between the back of each mounted camera and a central structure within the cubic configuration. The cavity further can help improve air flow. In other example embodiments, one or more sides of the cubic configuration may include unibody (or solid) panels to create a substantially enclosed structure that can withstand elements such as wind and moisture. In such embodiments, cooling may be achieved using heat sinks, an open cavity behind each camera and/or vents as needed.

The example embodiment of the camera mounting assembly 100 may securely attach two or more high definition cameras (or cameras) within high tolerance juxtaposition relative to each other. The secured attachment as described herein may allow for application of precise post capture image processing, for example, preforming image stitching with minimal computation intensity to achieve single composite image. It is noted that in one embodiment the camera may capture be used to capture video and/or still images. It also is noted the camera may be an activity camera, for example, a GOPRO camera such as a HERO 3, HERO 4, HERO 5, or other camera with similar dimensions and functionality. In alternate embodiments, the activity camera may be, for example, a GOPRO HERO SESSION camera or other activity camera with similar dimensions and functionality. An example of a camera architecture of a camera 310 for use with the camera mounting assembly 100 is further described below, e.g., with FIG. 4.

In the example embodiment illustrated in FIG. 1, the camera mounting assembly 100 has the cubic configuration and is configured to hold N number of cameras 310 (shown with FIG. 3), where N cameras provides for image capture in field of 4 pi steradian. For example, N can be three cameras 310 or N can be six cameras 310 or N can be twelve cameras 310. Each field of view provides for capture of an equal quality of a field of view (FOV).

In one embodiment, the cubic configuration includes a configuration (or structure) that appears as a cubic cage. The cubic configuration may be built by connecting one or more frames 120 to each other in a cubic manner. As previously noted, in this example the frame making up the six sides of the cubic configuration are an open air frame. Each frame 120 may be attached to other frames 120 of the cubic configuration by a securing mechanism 130 connected at a corner of each frame 120. Each frame 120 may be discreet and may be detachable from the cubic configuration. Examples of securing mechanism include screws, interlocking pins or any other releasable structure that can allow for opening up a side of a frame. Also by way of example, a cubic configuration may be achieved by attaching each frame to four other frames, an edge of each frame is attached is to the edges of two other frames to form a corner of a cube, and the three edges attached by a screw mechanism to form a cube corner. The cubic configuration may be partially detached by partially unscrewing some of the corner screws. For example, the screws at the base of the cubic configuration may remain screwed and the screws at the top corners of the cube may be partially unscrewed to avoid completely disassembling the cubic configuration. It is noted that in another example embodiment, the cubic configuration may be a unibody construction on one or more sides, e.g., two sides, and removable on the other sides.

One or more frames 120 may a unibody structure that may be made of polycarbonate, ABS, or other material capable of withstanding high impact. In alternate embodiments, one or more frames 120 may be multi-bodied comprised of two or more parts held together with mechanical locking mechanisms, e.g., clips, pins or interlocking or may be held together with a bonding chemical. Further by way of one example, a frame 120 may be of unibody construction, but one or more arms 170 may be a second piece that is interlocked with or glued to the frame 120. Each frame 120 includes a lens opening 150 that is connected to the frame outline via one or more arms 170. In one embodiment, the frame 120 of unibody construction includes the frame outline, the arms 170 and the lens opening 150.

The lens opening 150 for the camera lens is positioned within the frame 120 outline. An external portion of the lens opening 150 may include a ring panel 140 that may be raised above the plane of the remainder of a front plane of the frame 120. An internal portion of the lens opening 150 may be flush with the remainder of a back (or backside) plane of the frame 120. The front plane of the frame 120 that holds a front of the lens of the camera may be shaped in a manner such that the lens of the camera snaps into the front plane of the frame 120, thus preventing the lens of the camera from rotation. The front plane of the frame 120 with the ring panel 140 of the lens opening 150 is further illustrated in FIG. 2.

Continuing with FIG. 1, the lens opening 150 allows a lens of the camera 310 to have an unobstructed view outside the cubic configuration of the camera mounting assembly 100. The lens opening 150 may allow for mounting of a heat sink ring by way of a ring panel 140 around the lens opening 150. The heat sink may allow for accommodating pointing tolerances so that a field of view for the lens of the camera 310 remains in a fixed position. The ring panel 140 may be made of a material that allows cooling, e.g., aluminum, copper, or a composite material. In addition to cooling, the ring panel 140 along with one or more arms 170 may secure the camera within the lens opening 150. The one or more arms 170 may be placed at an angle of 90 degrees from each other, starting, for example, from the center of the lens opening. The one or more arms 170 support the body of the camera once the lens may be snap fit within the ring panel 140. This configuration can prevent rotation of the lens of the camera 310, by snap fitting a front of the camera lens within the front plane of the ring panel 140 and ensuring support of the camera body within the one or more arms 170. Securing the lens of the camera 310 allows the cubic configuration to remain stable and in-focus when capturing images, resulting in capture of high quality images.

Within the cubic configuration, cameras 310 are positioned within the frames 120. That allows for securing the cameras 310 within the cubic configuration and allow for the lens of the respective camera 310 to have an unobstructed view outside the configuration. The opening for the lens 150 may be a precision point. The precision point allows aligning the center point of the lens with the center point of the lens opening 150. The lens opening 150 positions the lens of the camera along the horizontal plane, e.g., the X-Y axis. Aligning and positioning the lens accurately within the lens opening 150 ensures that the stitching lines for an image are aligned for each field of view. In addition, there may be aligning pins within each frame 120 to help ensure that the lenses are aligned in a precise juxtaposition relative to other lenses of other cameras secured with the frames 120 of the cubic configuration. The aligning pins within frame 120 may be coupled to an inner edge of the frame 120 to hold the camera in a position such that the lens of the camera aligns with the lens opening 150. In particular, the aligning pin may apply pressure towards on the edge of the camera to position within the lens opening of the frame 120. The aligning pins releasably "lock" the edge of the camera within the aligning pins to prevent any movement of the camera 120 and secure the lens of the camera 120 within the lens opening 150.

Figure 2:
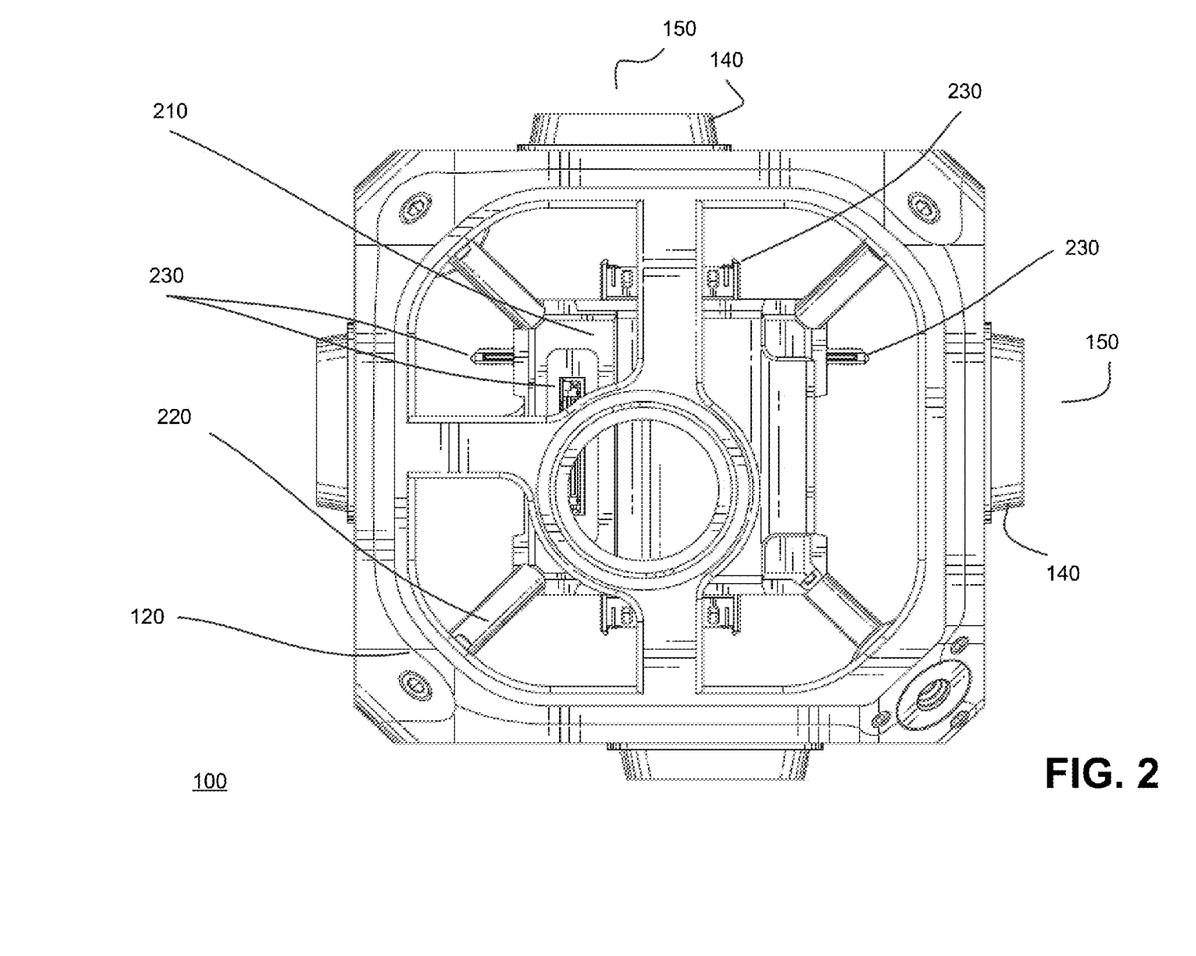
FIG. 2 illustrates a planar view of the camera mounting assembly for the plurality of cameras, according to an embodiment.

FIG. 2 illustrates a planar view of the camera mounting assembly for the plurality of cameras, according to an example embodiment. A standoff 220 is configured to secure a camera to the frame 120 to prevent movement of the camera 310. A standoff 220 may include concentric center threads within a circular or hexagonal body. A first end of the standoff 220 may be attached to a corner of the frame 120 by threading a screw within the standoff 220 and a hole at the corner of the frame 120. A second end of the standoff 220 may be attached to the body of the camera 310 such that the body of the camera 310 is supported on a flat end of a screw and the second end of the screw is threaded to the second end of the standoff 220. The first end of the standoff may be circular in shape, ensuring adequate support to handle the weight of the camera 310. Similarly, the second end may be circular in shape or any other shape that attaches to the camera 310 body. In other embodiments, the standoff 220 may be secured to the corner of the frame 120 and the body of the camera 310 via threaded studs, threaded nuts or fixed-depth bolts that thread into the standoff 220.

Connecting the camera 310 via standoffs 220 allows formation of a substantially open frame 120 structure creating vents for airflow between the interior and exterior of the cubic configuration. The vents may perform the function of a heat sink by allowing air to flow within the cubic configuration. In some example embodiments, a heat sink may be attached with the cubic configuration, for example on the ring panel 140. The heat sink allows for heat transfer away from the overall assembly of the cubic configuration of the camera mounting assembly 100 with cameras. An example heat sink is in U.S. Pat. No. 9,025,080, which is incorporated by reference.

The camera mounting assembly 100 may further include a box structure 210 located at the center of the cubic configuration. The box structure 210 is attached to the frame 120 via securing mechanisms such as one or more standoffs 220. A standoff 220 is configured to secure the box structure 210 to the frame 120 to prevent movement of the box structure 210. In one embodiment, a box structure 210 may be additionally attached to the camera via a standoff 220, the standoff between a back of the camera and a face of the box structure 210, to secure lens of the camera 310 within the frame 120, such that the camera 310 stays in focus. A standoff 220 may include concentric center threads within a circular or hexagonal body. A first end of the standoff 220 may be attached to a corner of the frame 120 by threading a screw within the standoff 220 and a hole at the corner of the frame 120. A second end of the standoff 220 may be attached to a corner of the box structure 210 such that the corner of the box structure 210 is supported on a flat end of a screw and the second end of the screw is threaded to the second end of the standoff 220. The first end of the standoff may be circular in shape, ensuring adequate support to handle the weight of the box structure 210. Similarly, the second end may be circular in shape or any other shape that attaches to the box structure 210. In other embodiments, the standoff 220 may be secured to the corner of the frame 120 and the corner of the box structure 210 via threaded studs, threaded nuts or fixed-depth bolts that thread into the standoff 220.

In addition to securing the camera 310 to the frame 120, the box structure 210 is configured to house electronics, power distribution, power distribution electronics as well as processing and communication electronics, for example, for synchronization of cameras 310. For example, electronics and code may be incorporated to designate one camera as a master clock camera to which the other cameras will synchronize. Alternately, the electronics may include a master clock to which all cameras, e.g., 310, within the assembly synchronize. It is noted that although the structure that houses electronics for communications and power is shown in the form of a rectangular box and is shown to be fixed within a center of the cubic configuration, the box may be of any other shape and may be located at other positions within the cubic cage structure. The box 210 also may include a connector 230 for connecting a power supply, for example, an external power supply. In one embodiment, a connector on the camera 310 may be plugged in to the connector 230 to establish an electrical connection for powering the camera 310. In addition to the electrical connection, the connector 230 secures the camera 310 by locking it in position within the camera mounting assembly 310. The box 210 may include other connectors in addition to the power supply connectors, for example, a connector for connecting to a global positioning system (GPS) or any other such systems. The connector 230 may be mounted on a face of the box structure 210. In some embodiments, the connector 230 may be embedded within the face of the box structure 210. This electronics housing may be referenced as a "backpack" and may allow for superseding power sources on the camera and may even allow for removing such sources from the cameras in some example embodiments thereby lightening the camera weight.

Figure 3:
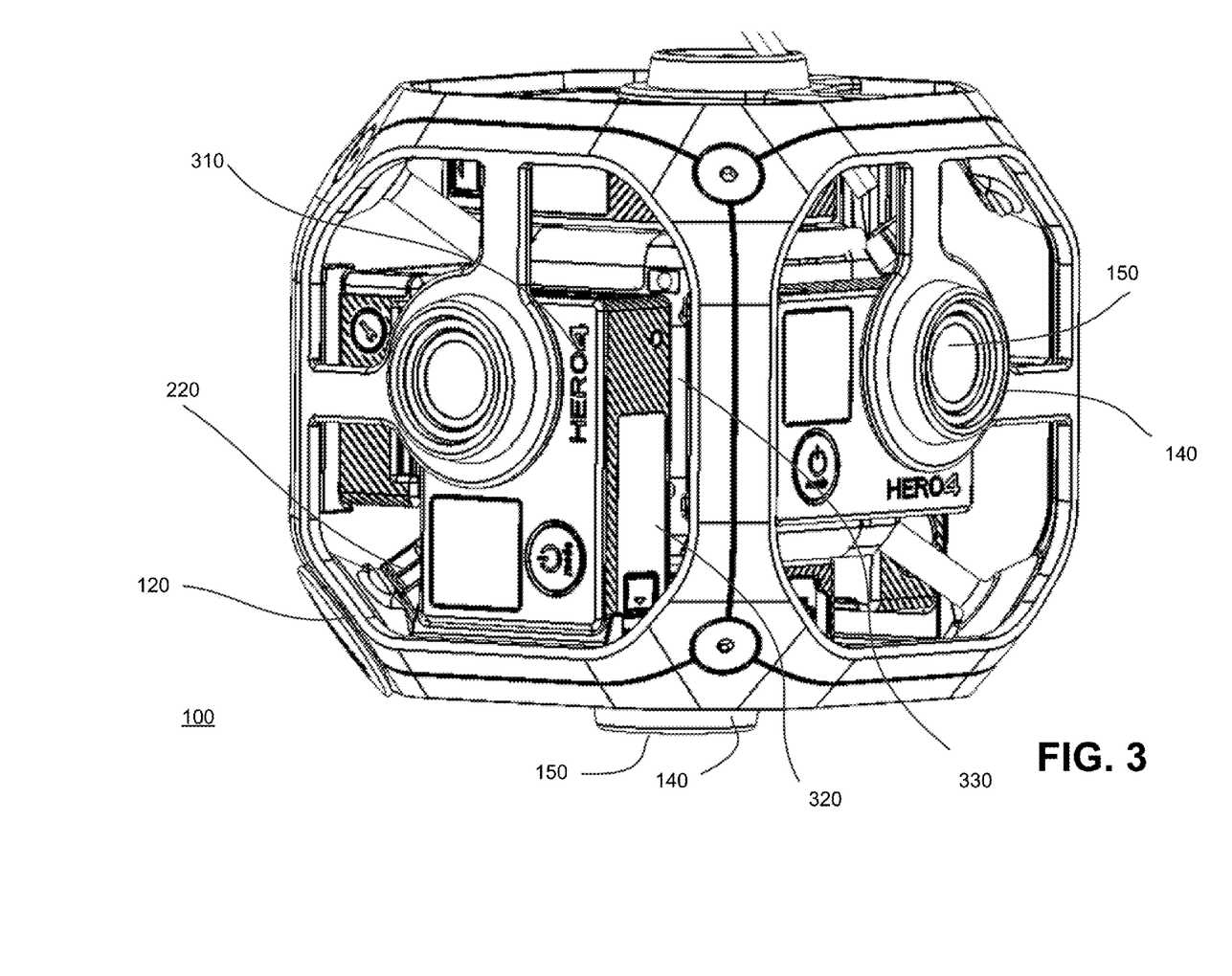
FIG. 3 illustrates a front-side perspective view of camera mounting assembly for the plurality of cameras, according to an embodiment.

FIG. 3 illustrates a front-side perspective view of camera mounting assembly 100 for the plurality of cameras 310, according to an example embodiment. In this example embodiment, the cameras 310 are secured to the frame 120 by a standoff 220 on the respective sides of the camera mounting assembly 100. Looking at one sides of the cubic configuration of the camera mounting assembly 100, a standoff 220 is configured to secure the camera 310 in a manner such that there is a predetermined minimum distance maintained between a back 320 of the camera 310 and a nearest face 330 of the box structure 210 located at the center of the cubic configuration of the camera mounting assembly 100. The predetermined minimum distance allows air to flow through the camera mounting assembly 100 in order to reduce thermal convection, for example, heating of one or more cameras 310 and/or the elements within the box structure 210. For example, a minimum of 7 millimeter (mm) gap may be maintained between the back of the camera 320 and the nearest face 330 of the box structure 210.

The mechanical configuration as shown and described can allow for securing the camera within the camera mounting assembly 100 so that the lens of each camera 310 may be properly positioned within the assembly 100. By having the camera 310 appropriately secured and positioned, two or more cameras 310 capturing images in their respective field of view can thereafter have the images from the field of view further processed with precision. For example, images from each field of view may be stitched along respective edges allowing for a larger image capture with minimal distortion and/or loss of portions of an image. The cameras 310 need not be in a fixed order for capturing of images, the cameras 310 may be hot-swapped, e.g., camera positions may be interchanged, or a missing camera may be inserted after other cameras have been configured.

Example Camera Architecture

Figure 4:
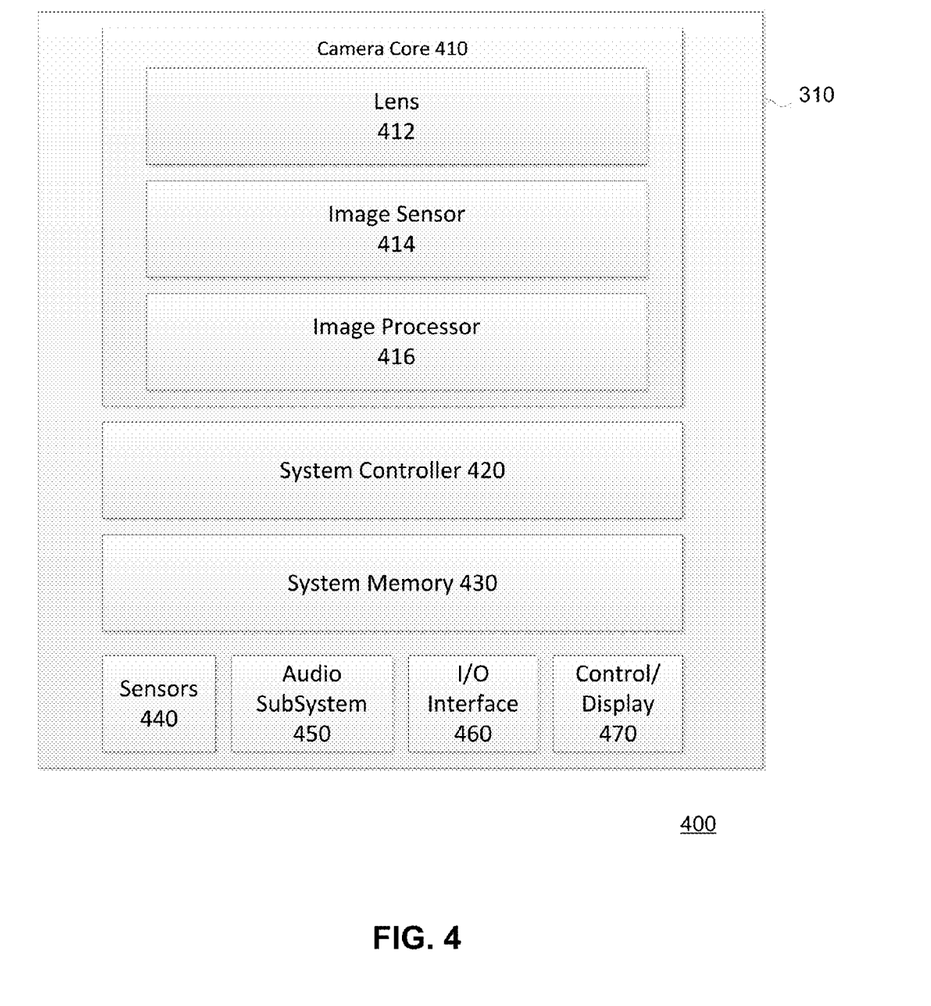
FIG. 4 illustrates an example camera architecture for use with the camera mounting assembly.

FIG. 4 illustrates a block diagram of an example camera architecture 400. The camera architecture 400 corresponds to an architecture for the camera, e.g., 310. In one embodiment, the camera 310 is capable of capturing spherical or substantially spherical content. As used herein, spherical content may include still images or video having spherical or substantially spherical field of view. For example, in one embodiment, the camera 310 captures video having a 360° field of view in the horizontal plane and a 180° field of view in the vertical plane. Alternatively, the camera 310 may capture substantially spherical images or video having less than 360° in the horizontal direction and less than 180° in the vertical direction (e.g., within 10% of the field of view associated with fully spherical content). In other embodiments, the camera 310 may capture images or video having a non-spherical wide angle field of view.

As described in greater detail below, the camera 310 can include sensors 440 to capture metadata associated with video data, such as timing data, motion data, speed data, acceleration data, altitude data, GPS data, and the like. In a particular embodiment, location and/or time centric metadata (geographic location, time, speed, etc.) can be incorporated into a media file together with the captured content in order to track the location of the camera 310 over time. This metadata may be captured by the camera 310 itself or by another device (e.g., a mobile phone) communicatively coupled with the camera 310. In one embodiment, the metadata may be incorporated with the content stream by the camera 310 as the spherical content is being captured. In another embodiment, a metadata file separate from the video file may be captured (by the same capture device or a different capture device) and the two separate files can be combined or otherwise processed together in post-processing. It is noted that these sensors 440 can be in addition to other sensors.

In the embodiment illustrated in FIG. 4, the camera 310 comprises a camera core 410 comprising a lens 412, an image sensor 414, and an image processor 416. The camera 310 additionally includes a system controller 320 (e.g., a microcontroller or microprocessor) that controls the operation and functionality of the camera 310 and system memory 430 configured to store executable computer instructions that, when executed by the system controller 420 and/or the image processors 416, perform the camera functionalities described herein. In some embodiments, a camera 310 may include multiple camera cores 410 to capture fields of view in different directions which may then be stitched together to form a cohesive image. For example, in an embodiment of a spherical camera system, the camera 310 may include two camera cores 410 each having a hemispherical or hyper hemispherical lens that each captures a hemispherical or hyper hemispherical field of view which is stitched together in post-processing to form a spherical image.

The lens 412 can be, for example, a wide angle lens, hemispherical, or hyper hemispherical lens that focuses light entering the lens to the image sensor 414 which captures images and/or video frames. The image sensor 414 may capture high-definition images having a resolution of, for example, 720p, 1080p, 4k, or higher. In one embodiment, spherical video is captured in a resolution of 5760 pixels by 2880 pixels with a 360° horizontal field of view and a 180° vertical field of view. For video, the image sensor 414 may capture video at frame rates of, for example, 30 frames per second, 60 frames per second, or higher. The image processor 416 performs one or more image processing functions of the captured images or video. For example, the image processor 416 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 430 and/or to a non-volatile storage, which may be in the form of internal storage or an external memory card.

An input/output (I/O) interface 460 transmits and receives data from various external devices. For example, the I/O interface 460 may facilitate the receiving or transmitting video or audio information through an I/O port. Examples of I/O ports or interfaces include USB ports, HDMI ports, Ethernet ports, audio ports, and the like. Furthermore, embodiments of the I/O interface 460 may include wireless ports that can accommodate wireless connections. Examples of wireless ports include Bluetooth, Wireless USB, Near Field Communication (NFC), and the like. The I/O interface 460 may also include an interface to synchronize the camera 310 with other cameras or with other external devices, such as a remote control, a second camera, a smartphone, a client device, or a video server.

A control/display subsystem 470 includes various control and display components associated with operation of the camera 310 including, for example, LED lights, a display, buttons, microphones, speakers, and the like. The audio subsystem 450 includes, for example, one or more microphones and one or more audio processors to capture and process audio data correlated with video capture. In one embodiment, the audio subsystem 450 includes a microphone array having two or microphones arranged to obtain directional audio signals.

Sensors 440 capture various metadata concurrently with, or separately from, video capture. For example, the sensors 440 may capture time-stamped location information based on a global positioning system (GPS) sensor, and/or an altimeter. Sensor data captured from the various sensors 440 may be processed to generate other types of metadata. For example, sensor data from the accelerometer may be used to generate motion metadata, comprising velocity and/or acceleration vectors representative of motion of the camera 310. In one embodiment, the sensors 440 are rigidly coupled to the camera 310 such that any motion, orientation or change in location experienced by the camera 310 is also experienced by the sensors 440. The sensors 440 furthermore may associates a time stamp representing when the data was captured by each sensor. In one embodiment, the sensors 440 automatically begin collecting sensor metadata when the camera 310 begins recording a video.

The camera 310 can be enclosed within a camera mounting structure 100, such as the one depicted in FIGS. 1 through 3. The camera mounting structure 100 can include electronic connectors which can couple with the corresponding camera (not shown) when a power and/or communication source is incorporated into the camera mounting assembly 100.

Additional Considerations

By way of example, a cubic mounting structure envelop the camera and provide for a thermal contact with one or more heat dissipation surfaces of said camera in order to provide for efficient thermal dissipation out of the camera into the substructure of the mount. The cubic camera mounts will comprise one or more cable management structures for retaining synchronizing connections. The system of N cameras will be identified sequentially, synchronized and hot swappable. The data captured by said cameras will be identified with the sequence and synchronization such that the aggregated data can be stitched in accordance to the cameras position within the mount and thus accurately represent the rendering of the 4 PI (caged) or less than 4 PI circular composite field of view or a full range panoramic view.

The disclosed configurations allow for heat dissipation, particularly when powering the cameras within it. For example, the substantially cubic camera cage includes an open air design so that the heat from the cameras 310 is not trapped with the structure.

Moreover, because the disclosed embodiments allow for an array of cameras 310 to be run on external power from a source on the cages, the batteries of the camera can be removed. This reduces heat generated by the cameras and also decreases weight of the overall assembly when cameras are mounted within the cages.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a multi-camera mount. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera mounting assembly for a plurality of cameras, the camera mounting assembly comprising:
    a cage structure including a plurality of detachable frames corresponding to each face of the cage structure, each of the plurality of detachable frames attached to one or more adjacent frames of the plurality of detachable frames via a securing mechanism at a corner of each of the plurality of detachable frames, each of the plurality of detachable frames comprising a frame outline around a perimeter of a corresponding face, a lens opening in an interior of the corresponding face, and one or more arms connected between the frame outline and the lens opening, the lens opening configured to secure around a lens on a front side of one of the plurality of cameras mounted within the cage structure;
    a interior structure located in an interior of the cage structure, the interior structure comprising a connector on one or more faces configured to couple to a back side of a respective camera of the plurality of cameras mounted within the cage structure; and
    one or more interior structure standoffs comprising a first end attached to a corner of one of the plurality of detachable frames, and a second end attached to the interior structure to secure the interior structure in the interior of the cage structure.

2. The camera mounting assembly of claim 1, wherein the interior structure is configured to house electronics, power, communication and processing elements for the plurality of cameras.

3. The camera mounting assembly of claim 1, wherein the interior structure comprises one or more camera standoffs having a first end of attached to a face of the interior structure and a second end for supporting a back of the camera such that the lens of the camera is aligned with the lens opening.

4. The camera mounting assembly of claim 1, wherein the lens opening comprises a ring panel around the lens opening wherein the ring panel is configured to prevent the lens of the camera from rotation.

5. The camera mounting assembly of claim 4, wherein a center of the lens opening aligns with a center point of the lens of the camera.

6. The camera mounting assembly of claim 1, wherein each frame of the cage structure is separable from other frames of the cage structure.

7. The camera mounting assembly of claim 3, wherein the camera standoffs are attached to the camera such that a predetermined distance is maintained between a back of the camera and a face of the interior structure.

8. The multiple camera mounting assembly of claim 1, further comprising a power connector mounted within the face of the interior structure.

9. The multiple camera mounting assembly of claim 1, further comprising a global positioning system connector mounted within the face of the interior structure.

10. The multiple camera mounting assembly of claim 1, wherein the securing mechanism at the corner of each frame is a screw.

11. The multiple camera mounting assembly of claim 10, wherein the cage structure is partially detached by partially unscrewing one or more screws of one or more frames.

12. A camera mounting assembly for a plurality of cameras, the camera mounting assembly comprising:
    a cage structure including a plurality of frames corresponding to each face of the cage structure, each of the plurality of frames attached to one or more adjacent frames of the plurality of frames, each of the plurality of frames comprising a frame outline around a perimeter of a corresponding face, a lens opening in an interior of the corresponding face, and one or more arms connected between the frame outline and the lens opening, the lens opening configured to secure around a lens on a front side of one of the plurality of cameras mounted within the cage structure;
    an interior structure located in an interior of the cage structure, the interior structure comprising a connector on one or more faces configured to couple to a back side of a respective camera of the plurality of cameras mounted within the cage structure; and
    one or more interior structure standoffs comprising a first end attached to a connection point on one of the plurality of detachable frames, and a second end attached to the interior structure to secure the interior structure in the interior of the cage structure.

13. The camera mounting assembly of claim 12, wherein the interior structure is configured to house electronics, power, communication and processing elements for the plurality of cameras.

14. The camera mounting assembly of claim 12, wherein the interior comprises one or more camera standoffs having a first end of attached to a face of the interior structure and a second end for supporting a back of the camera such that the lens of the camera is aligned with the lens opening.

15. The camera mounting assembly of claim 14, wherein the camera standoffs are attached to the camera such that a predetermined distance is maintained between a back of the camera and a face of the interior structure.

16. The camera mounting assembly of claim 12, wherein the lens opening comprises a ring panel around the lens opening wherein the ring panel is configured to prevent the lens of the camera from rotation.

17. The camera mounting assembly of claim 16, wherein a center of the lens opening aligns with a center point of the lens of the camera.

18. The multiple camera mounting assembly of claim 12, further comprising a power connector mounted within the face of the interior structure.

19. The multiple camera mounting assembly of claim 12, further comprising a global positioning system connector mounted within the face of the interior structure.

20. The multiple camera mounting assembly of claim 12, wherein the securing mechanism of each frame comprises a screw.

* * * * *